US012606686B2

(12) United States Patent
Chaudhary et al.

(10) Patent No.: US 12,606,686 B2
(45) Date of Patent: Apr. 21, 2026

(54) CROSSLINKED POLYOLEFIN FOAM AND PROCESS FOR PRODUCING SAME

(71) Applicant: Dow Global Technologies LLC, Midland, MI (US)

(72) Inventors: Bharat I. Chaudhary, Princeton, NJ (US); Jian Yang, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 967 days.

(21) Appl. No.: 17/788,812

(22) PCT Filed: Dec. 2, 2020

(86) PCT No.: PCT/US2020/062831
§ 371 (c)(1),
(2) Date: Jun. 24, 2022

(87) PCT Pub. No.: WO2021/133522
PCT Pub. Date: Jul. 1, 2021

(65) Prior Publication Data
US 2023/0046463 A1 Feb. 16, 2023

Related U.S. Application Data

(60) Provisional application No. 62/953,751, filed on Dec. 26, 2019.

(51) Int. Cl.
*C08J 9/14* (2006.01)
*C08L 23/06* (2006.01)
*C08L 23/08* (2025.01)
*C08L 23/26* (2025.01)

(52) U.S. Cl.
CPC .............. *C08J 9/141* (2013.01); *C08L 23/06* (2013.01); *C08L 23/08* (2013.01); *C08L 23/26* (2013.01); *C08J 2201/026* (2013.01); *C08J 2201/03* (2013.01); *C08J 2203/14* (2013.01); *C08J 2300/108* (2013.01); *C08J 2323/06* (2013.01); *C08J 2323/08* (2013.01)

(58) Field of Classification Search
CPC ............ C08J 9/12–149; C08J 2300/108; C08J 2323/06; C08J 2323/08; C08L 23/06; C08L 23/26
See application file for complete search history.

(56) References Cited

U.S. PATENT DOCUMENTS

| | | | |
|---|---|---|---|
| 3,573,152 A | 3/1971 | Wiley et al. | |
| 3,644,230 A | 2/1972 | Cronin | |
| 3,646,155 A * | 2/1972 | Scott ...................... | C08K 5/54 |
| | | | 525/288 |
| 4,214,054 A | 7/1980 | Matsuki et al. | |
| 4,323,528 A | 4/1982 | Collins | |
| 4,554,293 A | 11/1985 | Park | |
| 4,581,383 A | 4/1986 | Park | |
| 4,714,716 A | 12/1987 | Park | |
| 4,824,720 A | 4/1989 | Malone | |
| 4,870,111 A | 9/1989 | Donuiff et al. | |
| 5,026,736 A | 6/1991 | Pontiff | |
| 5,064,802 A | 11/1991 | Stevens et al. | |
| 5,266,627 A | 11/1993 | Meverden et al. | |
| 5,272,236 A | 12/1993 | Lai et al. | |
| 5,278,272 A | 1/1994 | Lai et al. | |
| 5,374,696 A | 12/1994 | Rosen et al. | |
| 5,387,050 A | 2/1995 | Hovis et al. | |
| 5,494,874 A | 2/1996 | Rosen et al. | |
| 5,532,394 A | 7/1996 | Rosen et al. | |
| 5,556,928 A | 9/1996 | Devore et al. | |
| 5,624,878 A | 4/1997 | Devore et al. | |
| 5,723,398 A | 3/1998 | Rosen et al. | |

(Continued)

FOREIGN PATENT DOCUMENTS

| | | |
|---|---|---|
| AU | 5245090 A | 10/1991 |
| CN | 1160411 A | 9/1997 |

(Continued)

OTHER PUBLICATIONS

Morshedian et al. Polyethylene Cross-linking by Two-step Silane Method: A Review. Iranian Polymer Journal, 2009, 18(2), 103-128. (Year: 2009).*

Rauwendaal et al. Polymer Processing: Extrusion. Encyclopedia of Polymer Science and Technology. John Wiley & Sons, Inc. 2017. (Year: 2017).*

Jieya. Melting point of polyethylene: a comprehensive guide. https://jieyatwinscrew.com/blog/polyethylene-melting-point/. As viewed on Jul. 9, 2025. (Year: 2025).*

Engage 8445 Properties. MatWeb. https://www.matweb.com/search/datasheet.aspx?matguid=0add93aba33d4f978407ab24c518018a&ckck=1. As viewed on Jul. 3, 2025. (Year: 2025).*

(Continued)

*Primary Examiner* — Stephen E Rieth
(74) *Attorney, Agent, or Firm* — Boyle Fredrickson S.C.

(57) ABSTRACT

The process disclosed includes an extruder under extrusion conditions at a temperature from 50° C. to 250° C., and a polymer composition. The polymer composition includes (A) greater than or equal to 5 wt % of a silane functionalized olefin-based polymer with first melting temperature, Tm1, (B) optionally, a nonsilane functionalized polyolefin, with second melting temperature, Tm2, (C) a highly effective silanol condensation catalyst (HEC), (D) a permeability modifier, and (E) optionally, a scorch inhibitor. The process includes introducing a physical blowing agent into the polymer composition to form a foamable composition. The foamable composition is cooled to a foaming temperature from 10° C. less than to 10° C. greater than Tm1. The foamable composition from an extruder exit die to form a foam composition. The foam composition is moisture cured to form a crosslinked foam composition having a density from 0.010 g/cc to 0.200 g/cc, and a gel content from 5% to 100%.

2 Claims, No Drawings

(56) References Cited

U.S. PATENT DOCUMENTS

| | | | |
|---|---|---|---|
| 5,763,498 A | 6/1998 | Knaus | |
| 5,783,638 A | 7/1998 | Lai et al. | |
| 5,817,705 A | 10/1998 | Wilkes et al. | |
| 5,844,009 A | 12/1998 | Hurley et al. | |
| 5,859,076 A | 1/1999 | Kozma et al. | |
| 5,876,813 A | 3/1999 | Bambara et al. | |
| 5,882,776 A | 3/1999 | Bambara et al. | |
| 5,883,144 A | 3/1999 | Bambara et al. | |
| 5,883,145 A | 3/1999 | Hurley et al. | |
| 5,929,129 A | 7/1999 | Feichtinger | |
| 5,932,659 A | 8/1999 | Bambara et al. | |
| 5,938,878 A | 8/1999 | Hurley et al. | |
| 5,986,028 A | 11/1999 | Lai et al. | |
| 5,998,006 A | 12/1999 | Bambara et al. | |
| 6,004,647 A | 12/1999 | Bambara et al. | |
| 6,054,005 A | 4/2000 | Hurley et al. | |
| 6,103,775 A | 8/2000 | Bambara et al. | |
| 6,167,790 B1 | 1/2001 | Bambara et al. | |
| 6,214,894 B1 | 4/2001 | Bambara et al. | |
| 6,221,928 B1 | 4/2001 | Kozma et al. | |
| 6,242,503 B1 | 6/2001 | Kozma et al. | |
| 6,262,137 B1 | 7/2001 | Kozma et al. | |
| 6,316,512 B1 | 11/2001 | Bambara et al. | |
| 6,350,512 B1 | 2/2002 | Hurley et al. | |
| 6,359,021 B2 | 3/2002 | Bambara et al. | |
| 6,531,520 B1 | 3/2003 | Bambara et al. | |
| 6,800,669 B2 | 10/2004 | Thoen et al. | |
| 7,355,089 B2 | 4/2008 | Chang et al. | |
| 7,504,347 B2 | 3/2009 | Poon et al. | |
| 7,514,517 B2 | 4/2009 | Hoenig et al. | |
| 7,524,911 B2 | 4/2009 | Karjala et al. | |
| 7,579,408 B2 | 8/2009 | Walton et al. | |
| 7,582,716 B2 | 9/2009 | Liang et al. | |
| 8,460,770 B2 * | 6/2013 | Chaudhary | C08K 5/05 |
| | | | 428/36.9 |
| 11,319,425 B2 | 5/2022 | Mundra et al. | |
| 2001/0027221 A1 | 10/2001 | Bambara et al. | |
| 2003/0087976 A1 | 5/2003 | Bambara et al. | |
| 2008/0097038 A1 | 4/2008 | Biscoglio et al. | |
| 2017/0183477 A1 * | 6/2017 | Talreja | C09D 123/0892 |
| 2020/0286645 A1 | 9/2020 | Wannerskog et al. | |
| 2021/0363319 A1 | 11/2021 | Piel et al. | |

FOREIGN PATENT DOCUMENTS

| | | |
|---|---|---|
| CN | 19931414 A | 7/2007 |
| CN | 108292546 A | 7/2018 |
| CN | 108369834 A | 8/2018 |
| CN | 110268032 A | 9/2019 |
| EP | 0280993 A1 | 9/1988 |
| JP | H10-195228 A | 7/1998 |
| JP | 2015-173036 A | 10/2015 |
| JP | 2016-37551 A | 3/2016 |
| WO | 95/14024 A1 | 5/1995 |
| WO | 95/17463 A1 | 6/1995 |
| WO | 98/49212 A1 | 11/1998 |
| WO | 2008/070022 A1 | 6/2008 |
| WO | 2019/067440 A1 | 4/2019 |
| WO | 2019/209547 A1 | 10/2019 |

OTHER PUBLICATIONS

CN202080090119.6 English Translation of CN Office Action 1 Dated Jul. 14, 2023.
CN202080090119.6 English Translation of CN Office Action 1 Search Report Dated Jul. 14, 2023.

* cited by examiner

CROSSLINKED POLYOLEFIN FOAM AND PROCESS FOR PRODUCING SAME

BACKGROUND

Low-density polyolefin foam has a foam density less than about 200 kilograms per cubic meter (less than 0.200 g/cc) and may be crosslinked or noncrosslinked. Crosslinked foam generally has superior physical properties (e.g., higher compression set and thermal resistance), compared to non-crosslinked foam. Crosslinked foam can also be produced in a batch process as either open cell foam or closed cell foam. However, the batch process used to produce crosslinked foam is economically unfavorable and often requires chemical blowing agents that are expensive.

Noncrosslinked polyolefin foam is typically produced with a extrusion process that (i) is continuous; (ii) has higher production rate; and (iii) is more economical than batch processes. Extrusion employs physical blowing agents that are less expensive than chemical blowing agents. However, the steep change in melt viscosity of a semi-crystalline polyolefin that occurs around its melting temperature results in a narrow range of foaming temperatures that can be employed in extrusion, thereby limiting the use of the extrusion process for the production of polyolefin foams.

Free-radical generators (e.g., peroxide, radiation), are typically used to achieve crosslinking of polyolefins. However, peroxides are incompatible with extrusion foaming processes because (i) extrusion of a peroxide-containing polymer composition must be carried out at low melt temperatures to avoid crosslinking occurring prematurely in the extruder and (ii) an extra vulcanization step at increased temperature after extrusion is required to decompose the peroxide and crosslink the polymer. Radiation can be used to crosslink extruded foams after exiting the die, but the radiation crosslinking process is expensive and is useful only with foams of relatively small thickness due to limited penetration depth.

Also known is moisture-induced crosslinking of extruded foam made with alkoxysilane functionalized polyolefin. Moisture-induced crosslinking of alkoxysilane functionalized polyolefin extruded foam taught in the prior art is disadvantageous because of the low efficacy of the silanol condensation catalyst and the requisite post-extrusion moisture treatment step at elevated temperature and humidity in a sauna or hot water bath.

The art recognizes the need for an extrusion process for the production of crosslinked foam that enables a wide foaming temperature range, that is efficient, cost-effective, and enables the control of forming open cells and/or closed cells, and wherein the production process does not require post-extrusion treatment step at elevated temperature and humidity, such as cure in a sauna and/or cure in a hot water bath.

SUMMARY

The present disclosure is directed to a process for the production of crosslinked foams, the process providing a wide (±10° C.) range for foaming temperature. The process avoids free radical crosslinking (no peroxide) and utilizes alkoxysilane functionalized polyolefin, the process also avoids moisture cure in a sauna and/or cure in a hot water bath.

The present disclosure provides a process. In an embodiment, the process includes providing, an extruder under extrusion conditions at a temperature from 50° C. to 250° C., and a polymer composition. The polymer composition includes (A) greater than or equal to 5 wt % of a silane functionalized olefin-based polymer having a first melting temperature, Tm1, (B) optionally, a nonsilane functionalized polyolefin, having a second melting temperature, Tm2, (C) a highly effective silanol condensation catalyst (HEC), (D) a permeability modifier, and (E) optionally, a scorch inhibitor. The process includes introducing, under the extrusion conditions, a physical blowing agent into the polymer composition to form a foamable composition. The process includes cooling the foamable composition to a foaming temperature that is from 10° C. less than to 10° C. greater than Tm1 and propelling the foamable composition from an exit die of the extruder to form a foam composition. The process includes moisture curing the foam composition to form a crosslinked foam composition having a density from 0.010 grams per cubic centimeter (g/cc) to 0.200 g/cc, and a gel content from 5% to 100%.

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight. For purposes of United States patent practice, the contents of any patent, patent application, or publication referenced herein are hereby incorporated by reference in their entirety (or the equivalent US version thereof is so incorporated by reference).

The numerical ranges disclosed herein include all values from, and including, the lower value and the upper value. For ranges containing explicit values (e.g., a range from 1, or 2, or 3 to 5, or 6, or 7) any subrange between any two explicit values is included (e.g., the range 1-7 above includes subranges from 1 to 2; from 2 to 6; from 5 to 7; from 3 to 7; from 5 to 6; etc.).

Unless stated to the contrary, implicit from the context, or customary in the art, all parts and percentages are based on weight, and all test methods are current as of the filing date of this disclosure.

The term "ambient conditions," as used herein, refers to a temperature from 10° C. to 35° C. (room temperature), a pressure from 0.95 to 1.05 atmospheres, or 1 atmosphere.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "cell density," as used herein, is the number of foam cells in a unit volume of the foam composition.

The term "cell nucleating agent," as used herein, is a compound, or composition, that provides sites for the growth of a foam cell.

The term "closed cell foam," as used herein, is a foam in which the foam cells are separated by membrane walls of polymeric material that do not have openings. A closed cell volume is not as readily in fluid communication with its external atmosphere as an open cell foam. The term "open cell foam," as used herein, is one in which either (i) there are no membrane walls of polymeric material separating the foam cells or (ii) there are openings in the membrane walls of polymeric material. An open cell volume is in fluid communication with its external atmosphere.

An "ethylene-based polymer," or an "ethylenic polymer," as used herein is a polymer that contains more than 50 weight percent polymerized ethylene monomer (based on the total amount of polymerizable monomers) and, optionally, may contain at least one comonomer.

The term "foam," or "foam composition," as used herein, is a structure constructed from a polymer, the structure comprises a plurality of channels extending from the surface of the structure into, and through, the structure. The channels are free of direction with respect to the longitudinal extension of the structure. The channels comprise a plurality of foam cells that are in fluid communication with the external atmosphere. The term "foam cell," or "cell," as used herein, is a discrete space within the foam composition. The foam cell is separated, or otherwise defined, by membrane walls comprising the polymer of the foam composition.

The term "foam collapse," as used herein, is a foamable composition that fails to expand sufficiently as it passes through the die at the foaming temperature employed.

The term "freeze off," as used herein, refers to the semi-crystalline polyolefin solidifying in the sections of the extrusion foaming process used to cool the foamable composition, such that heat transfer is impaired and the melt temperature at or just before the die starts increasing (and/or "foam collapse" starts).

The term "foaming temperature" refers to the final set temperature in a cooling section of a foam extruder or other suitable heat exchanger, the cooling section or other suitable heat exchanger located directly upstream of the exit die. For example, the foaming temperature may be the set temperature of the last zone of an extruder used to cool the foamable composition. The set temperature may or may not be different from the extrudate (foamable composition) melt temperature that is measured at the exit die.

An "olefin-based polymer," or "polyolefin," as used herein is a polymer that contains more than 50 weight percent polymerized olefin monomer (based on total amount of polymerizable monomers), and optionally, may contain at least one comonomer. Nonlimiting examples of olefin-based polymer include ethylene-based polymer (ethylenic polymer) and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

Test Methods

The term "cell count," or "average cell count," as used herein, is the number of cell wall intersections over a specified length. Cell count of the foam composition is measured over a specified length, by taking up to 10 measurements per foam specimen, and computing the average (i.e., "average cell count") per specified length.

The term "cell size," or "average cell size," as used herein, is a measure of the dimensions of foam cells. The cell size is determined by dividing the average cell count by the specified length and multiplying the result by 1.62, which is an established geometric factor for this purpose, as disclosed in Cellular Polymers, Vol. 21, No. 3, 165-194 (2002). Cell size (i.e., average cell size), is measured in accordance with ASTM D3576-77, and is reported in millimeters (mm).

Density of foam composition is measured in accordance with ASTM D-1622-88 with results reported in kilograms per cubic meter ($kg/m^3$) or grams per cubic centimeter (g/cc) at 25° C.

Density of polymer is measured in accordance with ASTM D792 with results reported in g/cc at 25° C.

Gel content of the foam composition is measured by extracting with decahydronaphthalene (decalin) in accordance with ASTM D2765-16 Method C with results reported as weight percentage. Thin slices of foam specimens are subjected to this test, instead of powder specimens that are usually used when this test is conducted on polymers.

Melt index (M1 or I2) is measured in accordance with ASTM D 1238, Condition 190° C./2.16 kg with results reported in grams per 10 minutes (g/10 min).

Melting temperature, or Tm, is measured by the DSC (Differential Scanning calorimetry) technique and refers to the peak melting points of semi-crysalline polyolefins measured as described in U.S. Pat. No. 5,783,638. It should be noted that many blends comprising two or more polyolefins will have more than one melting temperature, and many individual polyolefins will comprise only one melting temperature.

Open cell content of the foam composition is measured accordance with ASTM D2856-94, and is reported as a percentage from 0% to 100%. Open cell content is also measured from the penetration height of red colored water when foam specimens are immersed in a beaker containing red colored water. The steps are as follows: (a) cut foam samples into 100 mm long specimens; (b) mark a line at 50 mm distance from one end of each specimen; (c) immerse foam specimen in beaker of red colored water to maintain constant 50 mm length under water for fixed time of 1 minute; (d) remove foam specimen from water and wipe the liquid on the surface; (e) slice the foam along its length in half, using a blade; (f) inspect the inner surfaces of the foam specimen, revealed by slicing, and determine how far up the water penetrated. The greater the height of colored water penetration, the greater the open cell content (as a qualitative measurement).

DETAILED DESCRIPTION

The present disclosure provides a process. In an embodiment, the process includes providing, an extruder under extrusion conditions at a temperature from 50° C. to 250° C., and a polymer composition. The polymer composition includes (A) greater than or equal to 5 wt % of a silane functionalized olefin-based polymer having a first melting temperature, Tm1, (B) optionally, a nonsilane functionalized polyolefin, having a second melting temperature, Tm2, (C) a highly effective silanol condensation catalyst (HEC), (D) a permeability modifier, and (E) optionally, a scorch inhibitor. The process includes introducing, under the extrusion conditions, a physical blowing agent into the polymer composition to form a foamable composition. The process includes cooling the foamable composition to a foaming temperature that is from 10° C. less than to 10° C. greater than Tm1. The process includes propelling the foamable composition from an exit die of the extruder to form a foam composition, and moisture curing of the foam composition to form a crosslinked foam composition having a density from 0.010 grams per cubic centimeter (g/cc) to 0.200 g/cc, and a gel content from 5% to 100%.

A. Silane Functionalized Olefin-Based Polymer

The process includes providing a silane functionalized olefin-based polymer (or "Si-f-PO"). The Si-f-PO can be a silane functionalized propylene-based polymer (Si-f-PP) or a silane functionalized ethylene-based polymer (Si-f-PE). The Si-f-PO has a melting temperature, or a first melting temperature, Tm1.

In embodiment, the Si-f-PO is a silane functionalized ethylene-based polymer (Si-f-PE) that is a reactor ethylene/silane copolymer. The ethylene/silane copolymer is made of ethylene monomer and alkoxysilane comonomer, and optionally one or more other copolymerizable monomers (such as vinyl acetate, ethyl acrylate, etc.) copolymerized in a polymerization reactor. The polymerization reactor used to produce the reactor ethylene/silane copolymer can be (but is not limited to) a high pressure reactor. The term "high-pressure reactor," as used herein, is a polymerization reactor operated at a pressure of at least 34.47 megaPascal (mPa) (5000 pounds per square inch (psi)).

In an embodiment, the silane functionalized ethylene-based polymer is a silane grafted ethylenic polymer. The term "silane grafted ethylenic polymer," as used herein, is a alkylsiloxy ethylenic polymer made by post-reactor grafting of an alkoxysilane to an ethylenic polymer. In an embodiment, the alkoxysilane is grafted to the ethylenic polymer in the presence of a free radical initiator.

The ethylenic polymer is produced using conventional polyethylene polymerization technology, e.g., high-pressure, Ziegler-Natta, metallocene or constrained geometry catalysis. In an embodiment, the polyethylene is made in a high pressure reactor. In a further embodiment, the polyethylene is made using a mono- or bis-cyclopentadienyl, indenyl, or fluorenyl transition metal catalyst or a constrained geometry catalyst in combination with an activator, in a solution, slurry, or gas phase polymerization process. U.S. Pat. No. 5,064,802, WO93/19104 and WO95/00526 disclose constrained geometry metal complexes and methods for their preparation. WO95/14024 and WO98/49212 disclose substituted indenyl containing metal complexes and methods for their preparation.

In an embodiment, the ethylenic polymer is the product of post-reactor modification, such as reactive extrusion to make a graft copolymer.

In an embodiment, the ethylenic polymer can be branched, linear, or substantially linear. The term "branched ethylenic polymer," as used herein, is an ethylenic polymer prepared in a high-pressure reactor having a highly branched polymer structure, with branches found both on the polymer backbones and on the branches themselves. The term "substantially linear ethylenic polymer," as used herein, is an ethylenic polymer having a backbone that is substituted with 0.01 to 3 long-chain branches per 1,000 carbon atoms. In an embodiment, the ethylenic polymer can have a backbone that is substituted with 0.01 to 1 long-chain branches per 1,000 carbon atoms, or from 0.05 to 1 long-chain branches per 1,000 carbon atoms.

In an embodiment, the ethylenic polymer is a homopolymer, an interpolymer, a random or blocky copolymer, a functionalized polymer (e.g., ethylene vinyl acetate, ethylene ethyl acrylate, etc.) or a nonfunctionalized polymer. In a further embodiment, the ethylenic interpolymer is an elastomer, a flexomer, or a plastomer.

In an embodiment, the ethylenic polymer is an ethylene/$\alpha$-olefin copolymer. The $\alpha$-olefin includes $C_3$-$C_{20}$ linear, branched or cyclic $\alpha$-olefin, or a $C_4$-$C_8$ linear $\alpha$-olefin. Nonlimiting examples of $C_3$-$C_{20}$$\alpha$-olefins include propene, 1-butene, 4-methyl-1-pentene, 1-hexene, 1-octene, 1-decene, 1-dodecene, 1-tetradecene, 1-hexadecene, and 1-octadecene. The $\alpha$-olefins can have a cyclic structure such as cyclohexane or cyclopentane, resulting in an $\alpha$-olefin such as 3-cyclohexyl-1-propene (allyl cyclohexane) and vinyl cyclohexane. Nonlimiting examples of $C_4$-$C_8$ linear $\alpha$-olefin include 1-butene, 1-hexene, and 1-octene.

Nonlimiting examples of an ethylenic polymer include high density polyethylene (HDPE); medium density polyethylene (MDPE); linear low density polyethylene (LLDPE); low density polyethylene (LDPE); very low density polyethylene (VLDPE); homogeneously branched, linear ethylene/$\alpha$-olefin copolymers (e.g., TAFMER™ by Mitsui Petrochemicals Company Limited and EXACT™ by DEX Plastomers); homogeneously branched, substantially linear ethylene/$\alpha$-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are described in U.S. Pat. Nos. 5,272,236, 5,278,272 and 5,986,028, and the ethylene block copolymers are described in U.S. Pat. Nos. 7,579,408, 7,355,089 7,524,911, 7,514,517, 7,582,716 and 7,504,347.

In an embodiment, the ethylenic polymer comprises units derived from ethylene in an amount from 50, or 60, or 80, or 85 to 90, or 95, or 97, or 99, or 99.5, or 100 weight percent (wt %). In a further embodiment, the ethylenic polymer comprises units derived from ethylene in an amount from 50 to 100 wt %, or from 60 to 99.5 wt %, or from 80 to 95 wt %.

In an embodiment, the ethylenic polymer is an ethylene/$\alpha$-olefin interpolymer having a $\alpha$-olefin content from 15, or 20, or 25, to 40, or 45, or 50 wt % based on the weight of the interpolymer. In a further embodiment, the ethylenic polymer is an ethylene/$\alpha$-olefin copolymer having a $\alpha$-olefin content from 15 to 50 wt %, or from 20, to 45 wt % or from 25 to 40 wt % based on the weight of the interpolymer. The $\alpha$-olefin content may be determined by BC nuclear magnetic resonance (NMR) spectroscopy using the procedure described in Randall (Rev. Macromol. Chem. Phys., C29 (2&3)).

In an embodiment, the ethylenic polymer has a melt index (I2) from 0.1, or 0.5, or 1 to 2, or 5, or 10, or 20, or 30, or 50 g/10 min. In a further embodiment, the ethylenic polymer has a melt index (I2) from 0.1 to 50 g/10 min, or from 0.5 to 30 g/10 min, or from 1 to 5 g/10 min.

In an embodiment, the ethylenic polymer is void of, or otherwise excludes, a styrenic polymer (e.g., styrene, methyl styrene).

The ethylenic polymer may comprise two or more embodiments disclosed herein.

The term "alkoxysilane" or "alkoxysilane monomer," as used herein, is an alkoxysilane that will graft to an ethylenic polymer, or copolymerize with ethylene monomer. The alkoxysilane or alkoxysilane monomer has a structure described by the following formula $$H_2C = \overset{\overset{\displaystyle R^1}{|}}{C} - \left( \overset{\overset{\displaystyle O}{\|}}{C} - (C_nH_{2n})_y \right)_x SiR''_3$$

wherein $R^1$ is a hydrogen atom or methyl group;

x and y are 0 or 1 with the proviso that when x is 1, y is 1;

n is an integer from 1 to 12, and each R'' independently is a hydrolyzable organic group.

In an embodiment, each R'' independently is an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower alkyl group having 1 to 6 carbon atoms, wherein not more than one of the three R'' groups is an alkyl group.

In an embodiment, the alkoxysilane is an unsaturated silane having an ethylenically unsaturated hydrocarbyl group, (such as a vinyl, allyl, isopropenyl, butenyl, cyclohexenyl or gamma-(meth)acryloxy allyl group), and a hydrolyzable group, (such as, for example, a hydrocarbyloxy, hydrocarbonyloxy, or hydrocarbylamino group). Non-limiting examples of hydrolyzable groups include methoxy, ethoxy, formyloxy, acetoxy, proprionyloxy, alkyl and arylamino groups. In a further embodiment, the alkoxysilane and its method of preparation is described in U.S. Pat. No. 5,266,627 to Meverden, et al.

In an embodiment, the alkoxysilane is selected from vinyl trimethoxy silane (VTMS), vinyl triethoxy silane (VTES), vinyl triacetoxy silane, gamma-(meth)acryloxy propyl trimethoxy silane or a combination thereof.

In an embodiment, the alkoxysilane is vinyl trimethoxy silane (VTMS)) and/or vinyl triethoxy silane (VTES).

The alkoxysilane may comprise two or more embodiments disclosed herein.

In an embodiment, the silane functionalized ethylene-based polymer (Si-f-PE) is a reactor ethylene/silane copolymer comprising units derived from ethylene monomer and an alkoxysilane monomer. The reactor ethylene/silane copolymer consists of units derived from ethylene monomer and the alkoxysilane monomer as the only monomers.

Alternatively, the ethylene/silane copolymer additionally comprises units derived from one or more monomers other than ethylene monomer and the alkoxysilane monomer. In an embodiment, the ethylene/silane copolymer is void of, or otherwise excludes units derived from a styrenic monomer (e.g., styrene, methyl styrene).

In an embodiment, the Si-f-PE includes VTMS and/or VTES comonomer and has one, some, or all of the following properties:
(i) a melting temperature, Tm1, from 50° C., or 60° C., or 70° C., or 80° C., or 90° C., or 100° C., or 103° C., or 105° C., or 108° C. to 110° C., or 111° C., or 112° C., or 113° C., or 114° C., or 115° C. or 116° C., or 120° C., or 130° C., or 140° C.; and/or
(ii) a melt index (I2) from 0.3, or 0.5, or 1.0, or 1.3 to 1.7, or 2.0, or 3.0, or 10 g/10 min; and/or
(iii) a density from 0.860, or 0.880, or 0.900, or 0.910, or 0.913, or 0.916, or 0.920 to 0.925, or 0.930, or 0.950, or 0.980, or 1.0, or 1.3, or 1.4 g/cc; and/or
(iv) a VTMS content from 0.1, or 0.3, or 0.5, or 0.8, or 1.0, or 1.3 to 1.7, or 1.9, or 2.3, or 3.0, or 5, or 10 wt %, based on the total weight of the Si-f-PE; and/or
(v) a polydispersity index (PDI or Mw/Mn) from 1.7, or 2.0, 3.0, or 3.5, or 4.0, or 4.5, or 5.0, or 5.3 to 5.7, or 6, or 8, or 10, or 20.

In an embodiment, the Si-f-PE is a reactor ethylene/silane copolymer and consists only of units derived from ethylene monomer and VTMS comonomer and has one, some, or all of the following properties:
(i) a melting temperature, Tm1, from 95° C. to 140° C., or from 100° C. to 130° C., or from 105° C. to 115° C., or from 106° C. to 112° C., or from 108° C. to 110° C.; and/or
(ii) a melt index (I2) from 0.5 to 3 g/10 min, or from 1 to 2 g/10 min, or from 1.3 to 1.7 g/10 min; and/or
(iii) a density from 0.900 to 0.970 g/cc, or from 0.910 to 0.940 g/cc, or from 0.913 to 0.930 g/cc, or from 0.915 to 0.925 g/cc; and/or
(iv) a VTMS content from 0.3 to 5 wt %, or from 1.0 to 2.0 wt %, or from 1.0 to 1.7 wt %, based on the total weight of the ethylene/silane copolymer; and
(v) a polydispersity index (PDI or Mw/Mn) from 1.7 to 20.0, or from 2.0 to 10.0, or from 3.0 to 8.0, or from 4.0 to 6.0, or from 5.3 to 5.7.

In an embodiment, the Si-f-PO is an Si-g-PE and is present in an amount greater than 50 wt % based upon the total weight of the polymer composition.

In an embodiment, the Si-f-PO is an Si-g-PE and is present in an amount from 1, or 3, or 5, or 7, or 9, or 11, or 20, or 30, or 40, or 50, or 60, or 70, or 80 to 85, or 90, or 93, or 95, or 97, or 99, or 99.9 wt % based upon the total weight of the polymer composition. In a further embodiment, the Si-f-PE is present in an amount from 1 to 99.9 wt %, or from 5 to 99 wt %, or from 9 to 95 wt %, or from 30 to 93 wt %, or from 50 to 99 wt %, or from 70 to 95 wt %, or from 80 to 93 wt %, or from 89 to 95 wt %, or from 5 to 50 wt %, or from 5 to 30 wt %, or from 5 to 20 wt %, or from 5 to 15 wt %, or from 5 to 11 wt % based upon the total weight of the polymer composition.

The silane functionalized olefin-based polymer may comprise two or more embodiments disclosed herein.

B. Nonsilane Functionalized Polyolefin

The process includes providing an optional nonsilane functionalized polyolefin, component (B). When present, the nonsilane functionalized polyolefin is an ethylene-based polymer or propylene-based polymer void of silane functionality as previously described herein. In other words, the nonsilane functionalized polyolefin is void of alkoxysilane, is void of alkoxysilane monomer. The nonsilane functionalized polyolefin has a melting temperature, second melting temperature Tm2. Stated differently, in order to distinguish the melting temperatures for component (A) and component (B), the silane functionalized olefin-based polymer (A) has melting temperature denoted as first melting temperature, or Tm1, and the nonsilane functionalized polyolefin (B) has a melting temperature denoted as second melting temperature, or Tm2.

In an embodiment, the nonsilane functionalized polyolefin is a low density polyethylene (LDPE). The LDPE has a density from 0.900, or 0.910, or 0.920 to 0.930, or 0.940 g/cc. In a further embodiment, the LDPE has a density from 0.910 to 0.930 g/cc, or from 0.913 to 0.928 g/cc, or from 0.915 to 0.925 g/cc.

In an embodiment, the LDPE has a melt index (I2) from 0.1, or 0.5 to 1.0, or 2.0, or 3.0, or 5.0, or 10, or 20, or 30, or 50 g/10 min. In a further embodiment, the LDPE has a melt index (I2) from 0.1 to 10.0 g/10 min, or from 0.5 to 5.0 g/10 min, or from 1.0 to 3.0 g/10 min.

In an embodiment, the LDPE has a melting temperature (Tm2) from 100° C., or 103° C., or 106° C., or 108° C. to 110° C., or 111° C., or 112° C., or 114° C., or 116° C., or 118° C., or 120° C. In a further embodiment, the LDPE has a melting temperature from (Tm2) from 106° C. to 114° C., or from 108° C. to 112° C.

In an embodiment, the LDPE is present in an amount from 0, or greater than 0, or 1, or 3, or 5, or 7, or 9, or 11, or 20, or 30, or 40, or 50, or 80 to 90, or 93, or 95, or 99 wt % based upon the total weight of the polymer composition. In a further embodiment, the LDPE, is present in an amount from 1 to 99 wt %, or from 1 to 95 wt %, or from 5 to 93 wt %, or from 10 to 90 wt %, or from 20 to 80 wt %, or from 50 to 95 wt %, or from 80 to 90 wt %, or from 89 to 95% based on the total weight of the polymer composition.

In an embodiment, the LDPE has one, some, or all of the following properties:

(i) a melting temperature, Tm2, from 105° C. to 120° C., or from 107° C. to 115° C., or from 108° C. to 112° C.; and/or (ii) a melt index (I2) from 0.5 to 5.0 g/10 min, or from 1.0 to 3.0 g/10 min; and/or (iii) a density from 0.910 to 0.930 g/cc or from 0.915 to 0.925 g/cc.

The LDPE (the nonsilane functionalized polyolefin) may comprise two or more embodiments disclosed herein.

In an embodiment, the polymer composition comprises none of the nonsilane functionalized polyolefin.

C. Highly Effective Silanol Condensation Catalyst

The process includes providing a highly effective silanol condensation catalyst (HEC). The term "highly effective silanol condensation catalyst" or "HEC," is a catalyst other than dibutyltin dilaurate (DBTDL) (or otherwise a catalyst to the exclusion of DBTDL) that yields 1.5 times or greater faster crosslinking (moisture cure) than DBTDL at the same loading, at 23° C. and 50% relative humidity (of an extruded tape of given thickness, in the range of 1.3 to 1.8 mm, made from a fixed Si-f-PO, that is not foamed), as measured by days to 100% hot creep or 80% hot creep (150° C. or 200° C., 0.2 MPa).

Hot creep (also known as hot set elongation, or HSE) is measured to determine the degree of cure (crosslinking). Testing is based on the Insulated Cable Engineers Association ICEA-T-28-562-2003 standard for power cable insulation materials. Specimens are taken out along the extrusion direction from tapes of thickness values ranging from 0.8 mm to 2.0 mm. Three test specimens of each sample are cut using ASTM D 412 type D tensile bars (dumbbells). Hot creep testing is conducted on specimens (of measured thickness values) in an oven with a glass door set at 150° C. or 200° C. with a stress of 0.2 MPa applied to the bottom of the specimens. The test specimens are fixed vertically from upper ends in the oven with load attached to the lower end of each test specimen. The specimens are subjected to the hot creep test for 15 minutes at either 150° C. or 200° C., and the percentage increases in length are measured at that time interval. The average values of the three measurements (percentage increases in length) are reported as "hot creep" or HSE.

The term "1.5 times or greater faster crosslinking (moisture cure) than DBTDL at the same loading" means, for example, that if a fixed loading of DBTDL alone in an extruded tape specimen of given thickness (not foamed) made of a fixed Si-f-PO (or Si-f-PE) requires 18 days to attain 100% hot creep or 24 days to attain 80% hot creep (when cured at 23° C. and 50% relative humidity), using the same loading of HEC instead of the DBTDL alone enables 100% hot creep to be attained in 12 days or less, or 80% hot creep to be attained in 16 days or less, at the same cure conditions.

Representative cure data with extruded tape specimens of 1.5 mm thickness (not foamed) made of SI-LINK™ AC DFDB-5451 NT Polyethylene (Si-f-PO; Si-f-PE) are as follows. 100% hot creep (150° C., 0.2 MPa) is attained in 5 days and 80% hot creep (150° C., 0.2 MPa) is achieved in 6 days, using 0.14 wt % of an alkyl-substituted arylsulfonic acid (HEC). In comparison, 0.14 wt % DBTDL alone yields 100% hot creep (150° C., 0.2 MPa) in 13 days and 80% hot creep (150° C., 0.2 MPa) in 18 days.

The HEC is selected from any one of (i) to (iv): (i) a Brønsted acid; (ii) a Brønsted base; (iii) a Lewis acid, excluding DBTDL; and (iv) a Lewis base. The HEC may be either (i) or (iii); alternatively either (ii) or (iv).

In an embodiment, the HEC is a Brønsted acid, which may be a sulfonic acid of formula $RSO_3H$ wherein R is $(C_1-C_{10})$alkyl, $(C_6-C_{10})$aryl, a $(C_1-C_{10})$alkyl-substituted $(C_6-C_{10})$aryl, or a $(C_6-C_{10})$aryl-substituted $(C_1-C_{10})$alkyl; or a blocked sulfonic acid, which makes the sulfonic acid in situ.

The sulfonic acid may be a hydrophobic sulfonic acid, which is a sulfonic acid having a solubility in pH 7.0 distilled water from 0 to less than 0.1 g/mL at 23° C. after 24 hours. The sulfonic acid may be methanesulfonic acid, benzenesulfonic acid, alkyl-substituted arylsulfonic acid, an alkylbenzenesulfonic acid (e.g., 4-methylbenzenesulfonic acid, dodecylbenzenesulfonic acid, or a dialkylbenzenesulfonic acid), naphthalenesulfonic acid, or an alkylnaphthalenesulfonic acid.

In an embodiment, the highly effective silanol condensation catalyst is an aromatic sulfonic acid catalyst. A non-limiting example of an aromatic sulfonic acid catalyst is a polysubstituted aromatic sulfonic acid (PASA) catalyst. The PASA catalyst has a structure described by the formula $HSO_3Ar—R^3(R^4)_m$ wherein m is 1 to 3;

$R^3$ is $(CH_2)_zCH_3$, and z is 0 to 3;

each $R^4$ independently is the same or different than $R^3$; and

Ar is an aromatic moiety.

In a further embodiment, the PASA catalyst has a structure described by the formula $HSO_3Ar—R^3(R^4)_m$ wherein m is 0 to 3;

$R^3$ is $(CH_2)_zCH_3$, and z is greater than 20;

each $R^4$ independently is the same or different than $R^3$; and

Ar is an aromatic moiety.

In an embodiment, the aromatic moiety is a heterocycle (e.g., pyridine, quinolone) or a non-heterocycle (e.g., benzene or naphthalene).

In an embodiment, the value of z is from 15, or 30, or 45 to 55, or 65, or 80. In a further embodiment, the value of is from 15 to 80, or from 30 to 65, or from 45 to 55. When the value of z is greater than 20 the PASA includes α-olefin sulfonates, alkane sulfonates, isethionates (e.g., ethers or esters of 2-hydroxyethylsulfonic acid also known as isethionic acid), and propane sulfone derivatives, (e.g., oligomers or copolymers of acrylamido propane sulfonic acid).

In an embodiment, the HEC is a component of a masterbatch. The HEC is present in the masterbatch in an amount from 0.5, or 1, or 1.5, or 2 to 2.5, or 3.5, or 5, or 10, or 20, or 30, or 40, or 50 wt %. In a further embodiment, the HEC is present in the masterbatch in an amount from 0.5 to 50 wt %, or from 1 to 30 wt %, or from 2 to 10 wt %, or from 1.5 to 3.5 wt %. Nonlimiting examples of HEC masterbatches are SI-LINK™ AC DFDA-5488 NT Polyethylene and SI-LINK™ AC DFDB-5418 BK EXP1, each of which is composed of Brønsted acids.

In an embodiment, the HEC is present in an amount from 0.03, or 0.05, or 0.07, or 0.1, or 0.13, or 0.15, or 0.2, or 0.5, or 1, or 2, or 3, or 4, or 4.5 to 6 to 7, or 8, or 10, or 12 wt % based upon the total weight of the polymer composition. In a further embodiment, the HEC is present in an amount from 0.03 to 12 wt %, or from 0.05 to 8 wt %, or from 0.10 to 6 wt %, or from 0.03 to 0.20 wt %, or from 0.05 to 0.15 wt % based upon the total weight of the polymer composition.

In an embodiment, the HEC masterbatch includes one or more additives. Nonlimiting examples of suitable additives for the HEC masterbatch include antioxidant (e.g., bis(4-(1-methyl-1-phenylethyl)phenyl)amine; 2,2'-thiobis(2-t-butyl-5-methylphenol; 2,2'-thiobis(6-t-butyl-4-methylphenol; tris [(4-tert-butyl-3-hydroxy-2,6-dimethylphenyl)methyl]-1,3, 5-triazine-2,4,6-trione; pentaerythritol tetrakis(3-(3,5-bis(1, 1-dimethylethyl)-4-hydroxyphenyl)propionate; distearyl thiodipropionate ("DSTDP"); dilauryl thiodipropionate; or 2',3-bis[[3-[3,5-di-tert-butyl-4-hydroxyphenyl]propionyl]] propionohydrazide), colorant (e.g., carbon black), UV stabilizer (e.g., hindered amine light stabilizer such as N,N'-bisformyl-N,N'-bis(2,2,6,6-tetramethyl-4-piperidinyl)-hexamethylenediamine), titanium dioxide, zinc oxide and a metal deactivator (e.g., oxalyl bis(benzylidene)hydrazide (OABH)).

The HEC promotes crosslinking and moisture cure of the foam composition.

In an embodiment, the HEC by be blended with DBTDL.

The HEC may comprise two or more embodiments disclosed herein.

D. Permeability Modifier

The process includes providing a permeability modifier. The term "permeability modifier," as used herein, is a compound, or composition, that decreases the permeability of blowing agent in a given polyolefin, such that the blowing agent permeates out of a foam made with that polyolefin at approximately the same rate that air diffuses in. This results in a desirably (required) dimensionally stable foam. Without a permeability modifier, a blowing agent such as isobutane permeates out of a polyolefin foam faster than air permeates out. This can lead to dimensional instability of the foam, especially at low foam densities, such that substantial foam shrinkage occurs (leading to deterioration in foam properties). Nonlimiting examples of suitable permeability modifiers include amides and esters of $C_{10}$ to $C_{24}$ fatty acids. Such permeability modifiers are seen in U.S. Pat. Nos. 3,644,230 and 4,214,054. Esters may also reduce static during and after foam manufacture, which is another desirable attribute (especially when flammable gases such as isobutane are employed as physical blowing agents). Most preferred permeability modifiers include stearyl stearamide, glycerol monostearate, glycerol monobehenate, and sorbitol monostearate. When used, such permeability modifiers are typically employed in amounts ranging from greater than 0 to 10 wt % of the polymer composition.

In an embodiment, the permeability modifier is a fatty acid ester. The fatty acid ester has an alpha-monoester (or monoglyceride) content ranging from 30 to 99%, or 40 to 95%, or 50 to 90%. In a further embodiment, the permeability modifier is glycerol monostearate.

In an embodiment, the permeability modifier (e.g., glycerol monostearate) is a component of a masterbatch. In an embodiment, the permeability modifier (e.g., glycerol monostearate) is present in the masterbatch in an amount from 0.5, or 1, or 1.5, or 2 to 2.5, or 3.5, or 5, or 10, or 20, or 30, or 40, or 50 wt, or 60 wt %. In a further embodiment, the permeability modifier (e.g., glycerol monostearate) is present in the masterbatch in an amount from 0.5 to 60 wt %, or from 1 to 50 wt %, or from 2 to 30 wt %, or from 5 to 20 wt %.

In an embodiment, the permeability modifier (e.g., glycerol monostearate), is a component of the silane functionalized olefin-based polymer. In an embodiment, the permeability modifier is present in the silane functionalized olefin-based polymer in an amount from 0.01, or 0.05, or 0.1, or 0.2, or 0.5, or 1, or 5, or 10 to 15, or 25, or 40 wt %. Weight percent is based on the total weight of the silane functionalized olefin-based polymer.

In an embodiment, the permeability modifier (e.g., glycerol monostearate), is present in an amount from 0.01, or 0.1, or 0.2, or 0.3, or 0.5 to 1.0, or 2.0, or 5.0 wt % based upon the total weight of the polymer composition. In a further embodiment, the permeability modifier (e.g., glycerol monostearate), is present in an amount from 0.01 to 5.0, or from 0.1 to 2.0 or from 0.2 to 2.0 wt % based upon the total weight of the polymer composition.

The permeability modifier may comprise two or more embodiments disclosed herein.

The process includes providing (A) the silane functionalized olefin-based polymer, (B) the optional nonsilane functionalized polyolefin, (C) the highly effective silanol condensation catalyst, (D) the permeability modifier at the extrusion conditions at a temperature from 50° C. to 250° C., (E) optionally, the scorch inhibitor. The term "the extrusion conditions at a temperature from 50° C. to 250° C.," as used herein, includes (i) a process occurring in one or more extruders or other suitable melt processing equipment, (ii) heating and simultaneously blending, or otherwise homogeneously mixing, the components to provide the polymer composition in a flowable state, by heating the polymer composition within the temperature range from 50° C. to 250° C., (iii) introducing the blowing agent in the polymer composition at sufficient temperature and pressure to dissolve and disperse the blowing agent homogeneously and make a foamable composition without creating significant expansion. The extrusion conditions include a temperature from 50° C. to 250° C. and a pressure from 0.1 to 70 MPa, or from 1 to 50 MPa, or from 2 to 30 MPa. The extruder may include one or more extruders, each extruder having one or more temperature-controlled zones (i.e., zones).

The components are added in solid or liquid form to the extruder inlet. Any liquid component can be incorporated in one or more solid components prior to addition to the extruder. Alternatively, liquid component(s) can be injected into the extruder.

In an embodiment, the process includes heating and simultaneously blending the components (A), optional (B), (C), (D), and optional (E) in one or more extruders at a temperature from 140° C. to 250° C., or from 150° C. to 230° C., or from 160° C. to 220° C., or from 170° C. to 200° C. or from 160° C. to 190° C. and a pressure from 0.1 to 70, or from 0.5 to 60, or from 1 to 50, or from 2 to 40, or from 3 to 30, or from 4 to 20, or from 6 to 10 mega Pascal (MPa) to form the polymer composition. The polymer composition is in a flowable state, also known as an extrudate.

E. Physical Blowing Agent

The process includes introducing, into the extruder under the extrusion conditions from 50° C. to 250° C., a physical blowing agent into the polymer composition to form a foamable composition. The term "physical blowing agent," as used herein, is a compound, or composition, that (i) is dissolved in the polymer composition under the extrusion conditions, by virtue of being sufficiently soluble in the polymer composition at those conditions and (ii) comes out of solution under conditions (temperature, pressure) encountered during formation of a foam composition, as the foamable composition exits the die. The physical blowing agent is added to the polymer composition under the extrusion conditions to form a foamable composition. The term "foamable composition," as used herein, is a mixture of the polymer composition and the physical blowing agent under the extrusion conditions.

In an embodiment, the physical blowing agent is added to the polymer composition at a location downstream of the extruder inlet.

The extrusion conditions at a temperature from 50° C. to 250° C. include a pressure high enough to (i) prevent the blowing agent from creating expansion of the polymer composition and/or the foamable composition within the extruder or other suitable melt processing equipment and (ii) enable homogeneous dispersion of the blowing agent within the polymer composition. In an embodiment, the extrusion conditions include a temperature from 140° C. to 200° C. and a pressure from 1.40 to 3.00 MPa, or a temperature from 150° C. to 190° C. and a pressure from 1.80 to 2.80 MPa, or a temperature from 160° C. to 180° C. and a pressure from 2.20 to 2.60 MPa.

Nonlimiting examples of suitable physical blowing agent include $C_{1-6}$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_{1-5}$ organohalogens, $C_{1-6}$ alcohols, $C_{1-6}$ ethers, $C_{1-5}$ esters, $C_{1-5}$ amines, alcohols, ammonia, nitrogen, carbon dioxide, water, neon, helium, and combinations thereof.

In an embodiment, the physical blowing agent is one or more of n-butane, isobutane, n-pentane, isopentane, neopentane, carbon dioxide, ethanol, and 1,1-difluoroethane (HFC-152a).

In an embodiment, the physical blowing agent is isobutane or carbon dioxide. In a further embodiment, the physical blowing agent is a mixture (combination) of isobutane and carbon dioxide.

In an embodiment, the physical blowing agent is isobutane. The isobutane is present in an amount from 0.5, or 1, or 2, or 5, or 8, or 9 to 11, or 12, or 15, or 20, or 25, or 30 wt % based upon the total weight of the foamable composition. In a further embodiment, the physical blowing agent, (e.g., isobutane), is present in an amount from 0.5 to 30 wt %, or from 2 to 25 wt %, or from 5 to 20 wt %, or from 8 to 15 wt % based upon the total weight of the foamable composition.

The physical blowing agent may comprise two or more embodiments disclosed herein.

In an embodiment, a chemical blowing agent is used and generates one or more physical blowing agents, by thermal decomposition in the process. Chemical blowing agents include (but are not limited to) azodicarbonamide, azodi-isobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide, trihydrazino triazine and mixtures such as those of citric acid and sodium bicarbonate. Examples of chemical blowing agents are the various products sold under the tradename Safoam™ (products of Reedy International; Reedy Chemical Foam).

The process includes cooling the foamable composition to a foaming temperature that is from 10° C. less than to 10° C. greater than Tm1 (the melting temperature of the silane functionalized olefin-based polymer (A)). Applicant discovered the provision of greater than or equal to 5 wt % silane functionalized olefin-based polymer, optional a nonsilane functionalized polyolefin (B), the HEC (C), permeability modifier (D), and optional scorch inhibitor (E) unexpectedly enables a wide temperature range—namely up to a 20 degree (° C.) temperature range (±10° C. of Tm1)—for the foaming temperature in extrusion foaming.

In an embodiment, the foaming temperature is ±10° C. of Tm1, or the foaming temperature is ±8° C. of Tm1, or the foaming temperature is ±5° C. of Tm1, or the foaming temperature is ±3° C. of Tm1.

The process includes propelling the foamable composition from an exit die of the extruder at the foaming temperature to form a foam composition. The process further includes moisture curing the foam composition at ambient conditions to form a crosslinked foam composition. It is understood the humidity may be adjusted from 0% to 100%, or from 10% to 90%, or from 20% to 80%, or from 30% to 70% during the moisture cure. The crosslinked foam composition has a density from 0.010 grams per cubic centimeter (g/cc) to 0.200 g/cc, and a gel content from 5% to 100%. The foaming temperature is within a temperature range whereby neither (i) foam collapse nor (ii) freeze off occur during formation of the foam composition. The foaming temperature can be equal to, or greater than, or less than the melting temperature of the silane functionalized olefin-based polymer (A) or the nonsilane functionalized polyolefin (B).

In an embodiment, the process includes foaming at a foaming temperature from 50° C. to 180° C., or from 70° C. to 160° C., or from 90° C. to 140° C., or from 100° C. to 130° C., or from 100° C. to 120° C., or from 100° C. to 110° C., or from 105° C. to 110° C., or from 105° C. to 118° C.

In an embodiment, the silane functionalized olefin-based polymer (A) melting temperature, Tm1, is from 102° C. to 112° C. and the foaming temperature is ±10° C. of Tm1, or from 92° C. to 122° C.

In an embodiment, the silane functionalized olefin-based polymer (A) melting temperature, Tm1, is from 106° C. to 108° C. and the foaming temperature is ±10° C. of Tm1, or from 96° C. to 118° C.

In an embodiment, the silane functionalized olefin-based polymer (A) melting temperature, Tm1, is from 106° C. to 108° C. and the foaming temperature is ±5° C. of Tm1, or from 101° C. to 113° C.

The process includes forming a crosslinked foam composition having a density from 0.010 grams per cubic centimeter (g/cc) to 0.200 g/cc, and a gel content from 5% to 100%. In an embodiment, the process includes forming a crosslinked foam composition having a density from 0.010 to 0.200 g/cc, or from 0.015 to 0.100 g/cc, or from 0.020 to 0.080 g/cc, or from 0.030 to 0.070 g/cc, and a gel content from 5% to 100%, or from 10% to 95%, or from 20% to 90%, or from 30% to 80%, or from 40% to 70%.

In an embodiment, the process includes forming a cross-linked foam composition having one, some, or all of the following properties:

(i) a density from 0.010 to 0.200 g/cc, or from 0.015 to 0.100 g/cc, or from 0.020 to 0.080 g/cc, or from 0.030 to 0.070 g/cc; and/or (ii) a gel content from 5% to 100%, or from 10% to 95%, or from 20% to 90%, or from 30% to 80%, or from 40% to 70%; and/or (iii) a cell count from 4 cells per 12.7 mm to 60 cells per 12.7 mm, or from 5 cells per 12.7 mm to 40 cells per 12.7 mm, or from 7 cells per 12.7 mm to 20 cells per 12.7 mm, or from 5 cells per 12.7 mm to 7 cells per 12.7 mm; and/or (iv) cell size from 0.05 millimeters (mm) to 15 mm, or from 0.07 to 10 mm, or from 0.1 mm to 5.0 mm, or from 0.5 mm to 4.0 mm, or from 0.3 mm to 3.0 mm, or from 0.5 mm to 2.0 mm, or from 1.0 mm to 3.0 mm; and/or (v) open cells; and/or (vi) closed cells.

Foaming is accomplished when the foamable composition exits through a die of the extruder to a region of lower pressure and ambient conditions. In an embodiment, the process includes propelling, or otherwise conveying, the foamable composition through an exit die after the cooling extruder or other suitable melt processing equipment and foaming the foamable composition upon exit from the die to form a foam composition, and moisture cure of the foam composition to form the crosslinked foam composition. The pressure outside the exit die is lower than the pressures in the extruder, such that the foamable composition experiences a pressure drop as it is propelled through the exit die to the outside. The pressure drop causes the physical blowing agent to expand the foamable composition as it is propelled through the exit die, leading to foam formation. In other words, the pressure outside the exit die is lower than the pressures at which the foamable composition is maintained in the extrusion process prior to being propelled through the exit die. The pressure outside the exit die can be atmospheric, superatmospheric or subatmospheric (vacuum).

In an embodiment, the pressure in the extruder immediately before the foamable composition exits the exit die is from 0.1, or 0.5, or 1, or 2, or 3 to 4, or 6, or 8, or 1, or 20, or 30, or 40, or 50, or 60, or 70 MPa. In a further embodiment, the pressure in the extruder immediately before the foamable composition exits the exit die is from 0.1 to 70 MPa, or from 0.5 to 50 MPa, or from 1 to 30 MPa, or from 2 to 10 MPa, or from 3 to 6 MPa.

In an embodiment, the process is an accumulating extrusion process and apparatus as seen in U.S. Pat. Nos. 4,323, 528 and 5,817,705. This apparatus, commonly known as an "extruder-accumulator system" allows one to operate a process on an intermittent, rather than a continuous, basis.

In an embodiment, the foam composition is formed in a coalesced strand form by extrusion through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720.

In an embodiment, the foam composition is formed into foam beads suitable for molding into articles. Teachings to making bead foams are found in U.S. Pat. No. 6,800,669 B2.

The process includes forming a crosslinked foam composition. Light crosslinking (coupling of polymer chains) may or may not occur during the "the extrusion conditions at a temperature from 50° C. to 250° C." However, cross-linking predominantly occurs at ambient conditions after the foamable composition exits the exit die and the formed foam composition is in a solid state. Upon exit from the exit die, crosslinking occurs as the foam composition moisture cures at ambient conditions to form the crosslinked foam composition having a density from 0.010 g/cc to 0.200 g/cc and a gel content from 5% to 100%. Crosslinking occurs when hydrolysis of the alkoxysilane groups in a Si-f-PO creates silanol moieties that condense to form siloxane bonds. The HEC catalyzes hydrolysis of the alkoxysilane groups and condensation of the resulting silanol groups and thus accelerates crosslinking of the foam composition to form the crosslinked foam composition.

The moisture cure of the foam composition may be performed under conditions other than ambient conditions. In an embodiment, moisture cure is performed at a temperature from 36° C. to 95° C., or from 51° C. to 95° C., a relative humidity from 5% RH to 100% RH, and a pressure from 0.5 atm to 1.5 atm to form the crosslinked foam composition.

In an embodiment, the process includes forming a plurality of channels (or perforations), in the foam composition. The channels extend from a surface into the foam and are free of direction with respect to the longitudinal extension of the foam. The channels can (i) increase the rate of gas phase exchange of air with the physical blowing agent and (ii) decrease the time required to cure or crosslink the foam composition. The perforations facilitate more rapid diffusion of moisture to effect complete crosslinking. The foam composition is cured at ambient conditions for a duration from 0.2, or 0.5, or 1, or 2, or 3, or 5, to 7, or 10, or 15, or 21, or 30, or 45, or 60, or 90, or 120 or 150 or 180 days to form the crosslinked foam composition with a density from 0.010 to 0.200 g/cc and a gel content from 5% to 100%.

In an embodiment, hydroxyl-terminated polydimethylsiloxane (PDMS) may be incorporated in the formulation, as a way to accelerate crosslinking and be less dependent on requiring curing of the foam in a humid or water environment.

In an embodiment, crosslinking occurs while the foamable composition is propelled from or through the exit die.

In an embodiment, crosslinking occurs after the foamable composition is propelled from the exit die.

In an embodiment, crosslinking occurs during cooling of the foamable composition, during cooling of the foam composition, and a combination thereof.

The degree, or amount, of crosslinking present in the crosslinked foam composition is dependent upon the amount of the Si-f-PO and the amount of HEC present in the polymer composition, as well as the amount of copolymerized or grafted alkoxysilane in the Si-f-PO. Higher degree of crosslinking (gel content from 50% to 100%) improves properties such as upper service temperature and compression set of the crosslinked foam composition. Lower degree of crosslinking (gel content 5% to 49%) increases melt strength of the foamable composition, which in turn desirably enables a wider foaming temperature range for making foam composition with varied open-cell content (from 0%, or greater than 0% to 100%).

In an embodiment, the process includes adding a scorch inhibitor to the polymer composition. The term "scorch inhibitor," as used herein, is a compound, or composition, that prevents excessive polymer coupling or crosslinking during melt extrusion or processing (during the heating and/or cooling steps), prior to cure of the foam composition. The scorch inhibitor, for purposes of the present disclosure can also be referred to as a "scorch retardant" or "moisture scavenger." In an embodiment, the scorch inhibitor is added to one or more of the solid components prior to blending the polymer composition.

Nonlimiting examples of suitable scorch inhibitor include alkylalkoxysilanes, and combinations thereof. Nonlimiting examples of alkylalkoxysilanes include octyltriethoxysilane, octyltrimethoxysilane and hexadecyltrimethoxysilane.

In an embodiment, the scorch inhibitor is octyltriethoxysilane. The scorch inhibitor is present in an amount from 0, or 0.01, or 0.03, or 0.05, or 0.1, or 0.5 to 1.0, or 2.0, or 5.0 wt % based upon the total weight of the polymer composition. In a further embodiment, the scorch inhibitor, is present in an amount from 0 wt %, or from 0.01 to 5.0 wt %, or from 0.1 to 2.0 wt % or from 0.5 to 2.0 wt % based upon the total weight of the polymer composition.

In an embodiment, the process includes adding a cell nucleating agent to the polymer composition. The cell nucleating agent facilitates formation of more foam cells leading to smaller cell sizes and a higher cell density thereby. Higher cell density is correlated with smaller sized foam cells. In an embodiment, the cell nucleating agent is added to the solid components prior to forming the polymer composition.

In an embodiment, the cell nucleating agent is talc or calcium carbonate or a chemical blowing agent. In a further embodiment, the cell nucleating agent is talc.

The process includes a residence time. The term "residence time," as used herein, is the time that passes between (i) addition of the solid components to the extruder inlet and (ii) propelling the foamable composition through the exit die. The residence time applies to a combination of the various melt-processing steps of heating, blowing agent addition, cooling, optional holding zone before the die (as in an accumulating extrusion process), and propelling through the exit die. The residence time is measured from addition of the solid components to the extruder inlet up to the exit die, and is the time it takes for the foamable composition to start coming out of the exit die. In an embodiment, the residence time is from 5 minutes (min) to 80 min, or from 6 min to 70 min, or from 8 min to 60 min, or from 10 min to 40 min, or from 12 min to 30 min. In an embodiment, a complete change from one foamable composition takes up to 1 residence time, or 2 residence times, or 3 residence times, or 4 residence times, or 5 residence times, or 6 residence times, or 7 residence times, or 8 residence times, or 9 residence times, or 10 residence times.

In an embodiment, the process described herein is a continuous process. The continuous process includes and is not limited to the steps of (i) adding the solid components to the extruder inlet; (ii) forming the polymer composition under the extrusion conditions; (iii) introducing the physical blowing agent under the melt processing conditions; (iv) cooling the foamable composition; and (v) propelling the foamable composition through the exit die to form the foam composition.

The process includes forming a crosslinked foam composition comprising open cells or closed cells, or a combination thereof.

In an embodiment, the process includes forming a crosslinked foam composition comprising open cells.

In an embodiment, the process includes forming a crosslinked foam composition comprising closed cells.

In an embodiment, the process includes forming a crosslinked foam composition comprising both open cells and closed cells. The crosslinked foam composition has from 0% to 30% open cells and a reciprocal amount of closed cells, or from 100% to 70% closed cells. In another embodiment, the process includes forming a crosslinked foam composition having from 30% to 80% open cells and a reciprocal amount, or from 70% to 20% closed cells.

In an embodiment, the silane functionalized olefin-based polymer is an ethylene/silane copolymer with a Tm1 from 106° C. to 110° C. and the process includes foaming, at foaming temperature from 106° C. to 118° C. to form a foam composition, and moisture cure at ambient conditions to form a crosslinked foam composition having the ethylene/silane copolymer present in an amount from 5 to 99 wt %, or from 9 to 95 wt %, or from 30 to 93 wt %, or from 60 to 99.5 wt %, or from 80 to 99 wt %, or from 92 to 97 wt %, based on the weight of the composition. The crosslinked foam composition has one or both of the following properties:

(i) a density from 0.010 to 0.200 g/cc, or from 0.015 to 0.100 g/cc; and/or (ii) a gel content from 5% to 100%, or from 10% to 95%; and the composition is void of the nonsilane functionalized polyolefin (B).

In an embodiment, the polymer composition includes (A) from 5 wt % to 10 wt % of an ethylene/silane copolymer with a Tm1 from 106° C. to 110° C., (B) from 80 wt % to 90 wt % nonsilane functionalized polyolefin that is LDPE with Tm2, wherein Tm2 is greater than Tm1, and (C) from 0.03 to 12.0 wt % HEC. The process includes foaming at a foaming temperature from 10° C. less than to 10° C. greater than Tm2 to form a foam composition; and forming a crosslinked foam composition having a density from 0.015 g/cc to 0.100 g/c and a gel content from 10% to 95%. In a further embodiment, Tm2 for the LDPE is from 111° C. to 116° C. and the process includes foaming at a foaming temperature from 111° C. to 121° C.

In an embodiment, the process includes adding one or more additives to the polymer composition, the foamable composition, or combinations thereof. Nonlimiting examples of suitable additives include inorganic fillers, pigments, antioxidants, acid scavengers, ultraviolet light absorbers, flame retardants, processing aids, extrusion aids, antistatic agents, other thermoplastic polymers, hydroxyl-terminated polydimethylsiloxane (PDMS), and combinations thereof.

The foamable composition can be used to form extruded thermoplastic polymer foam, or expanded thermoplastic foams, expandable thermoplastic foam beads, and molded articles formed by expansion, coalescing and/or welding of the foams and/or beads.

The crosslinked foam composition can take any known physical configuration, such as extruded sheet, rod, plank, films and profiles. The crosslinked foam composition also may be formed by molding expandable beads into any of the foregoing configurations or any other configuration.

The crosslinked foam composition can be used in applications, including those listed in U.S. Pat. No. 6,800,669 B2. Nonlimiting examples of applications include cushion packaging, athletic and recreational products, egg cartons, meat trays, building and construction, acoustical insulation, pipe insulation, gaskets, vibration pads, luggage liners, desk pads shoe soles, gymnastic mats, insulation blankets for greenhouses, case inserts, absorptive foams (e.g., to clean up oil spills, for health and hygiene applications, etc.) and display foams. Nonlimiting examples of building and construction applications include external wall sheathing (home thermal insulation), roofing, foundation insulation, and residing underlayment. Further applications of the foam composition include insulation for refrigeration, buoyancy applications (e.g., body boards, floating docks and rafts) as well as various floral and craft applications.

In an embodiment, the crosslinked foam composition has a thickness or diameter from 0.5 mm to 5000 mm, or from 1.0 mm to 3000 mm, or from 5 mm to 2000 mm, or from 10 to 1000 mm, or 25 mm to 500 mm. The crosslinked foam composition may be formed by laminating two or more foam layers or at least one foam layer and at least one polymer layer).

By way of example, and not limitation, some embodiments of the present disclosure are described in detail in the following examples.

EXAMPLES

The raw materials for use in the Inventive Examples ("IE") and Comparative Samples ("CS") are detailed in Table 1 below.

The highly effective condensation catalyst (HEC) masterbatch is prepared in a 420 mL BRABENDER mixing bowl equipped with cam rotors. Raw materials are used in an amount sufficient to fill the mixing bowl to 70 percent capacity. The mixing bowl is heated to 160° C. and the rotor speed is set to 25 rotations per minute (rpm). The carrier resin is a nonsilane functionalized polyolefin. Half of the carrier resin is added to the preheated bowl and fluxed resin until a complete melt is formed. The silanol condensation catalyst (e.g., a sulfonic acid), is slowly added to, and incorporated into, the carrier resin melt. Antioxidant and other additives are then added. The rotor speed is increased to 40 rpm and the mixture is fluxed for 5 minutes. The mixture is removed from the mixing bowl and cold pressed for 5 minutes under a load of 0.689 to 1.38 MPa (100 to 200 pounds per square inch (psi)) to form a plaque. The plaque is cut into several pieces which are fed into a BRABENDER model Prep Mixer/Measuring Head laboratory electric batch mixer equipped with 24:1 L/D extruder, and extruded at a screw speed of 40 rpm using a 20/40/20/40/20 mesh screen pack and a flat set temperature profile of 160° C. across zone 1, zone 2, zone 3 and the die. The resulting strand extrudate is milled in a Wiley mill to produce the HEC masterbatch as pellets.

TABLE 1

| Raw Materials | | |
| --- | --- | --- |
| Commercial Name | Composition/Properties | Source |
| SI-LINK ™ AC DFDB-5451 NT | Ethylene/VTMS copolymer Density: 0.922 g/cc, | Dow, Inc. |

TABLE 1-continued

| Raw Materials | | |
| --- | --- | --- |
| Commercial Name | Composition/Properties | Source |
| Polyethylene (Reactor ethylene silane copolymer + scorch inhibitor) | Melt index: 1.5 g/10 min VTMS content: 1.5 wt % melting temperature, Tm1: 106° C. | |
| LDPE 450 E (nonsilane functionalized polyolefin) | LDPE Density: 0.923 g/cc, Melt index: 2.0 g/10 min melting temperature, Tm2: 111° C. | Dow, Inc. |
| AGILITY ™ 1021 Performance LDPE (nonsilane functionalized polyolefin) | LDPE Density: 0.920 g/cc, Melt index: 1.85 g/10 min Melting temperature, Tm2:108° C. | Dow, Inc. |
| HEC masterbatch | Blend of a thermoplastic ethylenic polymer, a phenolic compound, and about 3 wt % of an alkyl-substituted arylsulfonic acid. | Dow, Inc. |
| HS-E01 (Glycerol monostearate masterbatch) (permeability modifier) | 50 wt % glycerol monostearate (GMS) in a LDPE carrier resin. GMS content: 50% Alpha mono content: 90% Color: white Melt index: 320 g/10 min Softening point: 70° C. | Polyvel Inc. |
| Mistron Vapor R | Talc Median particle size: 2.2 μm | Imerys Talc |

Foam compositions are prepared with a tandem extrusion system having a mixing extruder and a cooling extruder that is fed by the mixing extruder. The mixing extruder is a co-rotating twin screw extruder with 34 mm diameter screws specially configured to ensure good mixing of the polymer composition and blowing agent while forming the foamable composition. The mixing extruder is operated at 10 amperes (amps), at a set temperature across all zones of 180° C., and a screw speed of 55 rpm.

The cooling extruder is a single screw extruder with a 40 mm diameter screw. The barrel and the die temperatures of the cooling extruder are controlled among four zones using separate oil heaters. Zone 1 and Zone 2 are operated at set temperatures of 129° C. and 116° C., respectively. The set temperature of Zone 3 is the foaming temperature of the foamable composition. The cooling extruder is operated at 7 amps with a screw speed of 22 rpm. A 3 mm diameter rod die was attached at the end of the cooling extruder. The temperature of the die was maintained at from 20° C. less than to 20° C. greater than the higher of Tm1 or Tm2.

The components of the polymer composition are dry blended and then fed into the inlet of the mixing extruder through a solid metering feeder. Complete melting of the polymer components is achieved and the blowing agent (isobutane), is injected into the mixing extruder at 20 LID of the extruder using a positive displacement pump (dual piston HPLC pump). The flow rate of the polymer is maintained at 36 grams per minute (g/min). The residence time of the process, from addition of the solid components to the extruder inlet up to the exit die, is 12 minutes.

The resulting foam compositions are moisture cured at 23° C. and 50% humidity for 150 days.

Foam compositions for Comparative Samples CS1-CS3 are prepared according to the formulations listed in Table 2 below with the raw materials listed in Table 1. CS1 is formed from LDPE 450E at a foaming temperature of 113° C. and created closed cell foam with cell size of 2.9 mm and 0% gel content. CS2-CS3 are formed from Agility™ 1021 LDPE. CS2 and CS3 created closed cell foams at a foaming temperature of 110° C. See Table 2. At a foaming tempera-
ture greater than 113° C. with CS1 or greater than 110° C.
with CS2 to CS3 (not shown in Table 2), foam collapse was
evident. At a foaming temperature less than 112° C. with
CS1 or less than 109° C. with CS2 to CS3 (not shown in
Table 2), the melt temperature at the die began to increase,
which indicates that freeze off was beginning to occur. These
observations are consistent with the narrow foaming tem-
perature range of 1° C. reported previously for extrusion
foaming of LDPE with isobutane (Journal of Cellular Plas-
tics, Vol. 35, 531-549 (1999) and Journal of Cellular Plas-
tics, Vol. 36, 397-421 (2000)).

TABLE 2

| | | Compositional Parts | |
| | CS 1 | CS2 | CS 3 |
| --- | --- | --- | --- |
| LDPE 450E | 97.5 | | |
| Agility 1021 | | 97.5 | 97.5 |
| HS-E01 with glycerol monostearate (GMS) content of 50 wt % | 2 | 2 | 2 |
| Mistron Vapor R Talc | 0.5 | 0.5 | 0.5 |
| Polymer composition (total parts) | 100 | 100 | 100 |
| Isobutane | 10 | 10 | 10 |
| Foamable composition (total parts) | 110 | 110 | 110 |
| Zone 3 Set Temperature (° C.) "Foaming Temperature" | 112.7 | 110.0 | 110.0 |
| Properties of Foam Composition | | | |
| Density (g/cc) | 0.056 | 0.075 | 0.072 |
| Cell type | closed | closed | closed |

TABLE 2-continued

| | | Compositional Parts | |
| | CS 1 | CS2 | CS 3 |
| --- | --- | --- | --- |
| Cell count per 12.7 mm | 7.2 | *NM | *NM |
| Cell size (mm) | 2.9 | *NM | *NM |
| Gel content (wt %) | 0 | *NM | *NM |

*Not measured
wt % GMS in polymer composition = 1
wt % isobutane in foamable composition = 9

Foam compositions for Inventive Examples IE1-IE15 are
prepared according to the formulations listed in Table 3
below with the raw materials listed in Table 1.

IE1-IE10 are formed from reactor ethylene/silane copo-
lymer. IE1-IE8 produced at a foaming temperature from
107.8° C. to 111.7° C. created open cell foam or partially
open cell foam. IE9 produced at a foaming temperature of
107.2° C. created open cell foam with density of 0.058 g/cc.
IE10 formed at a foaming temperature of 106.1° C. created
closed cell foam with density of 0.044 g/cc.

IE1-IE10 have a foaming temperature range from 106.1°
C. to 111.7° C.

IE11-IE15 formed from a blend of reactor ethylene/silane
copolymer and nonsilane functionalized polyolefin at a
foaming temperature range from 111.7° C. to 116.1° C.
created closed cell foam.

Cell size of the crosslinked foam compositions IE9 and
IE10 are 3.9 mm and 3.1 mm, respectively.

Gel content after moisture cure of the foam compositions
to form crosslinked foam compositions IE9, IE10 and IE15
are 74.3 wt %, 73.3 wt % and 10.8 wt %, respectively.

TABLE 3

| | IE 1 | IE 2 | IE 3 | IE 4 | IE 5 | IE 6 | IE 7 | IE 8 |
| | | | | Compositional Parts | | | | |
| --- | --- | --- | --- | --- | --- | --- | --- | --- |
| (A) SI-LINK ™ AC DFDB-5451 with scorch inhibitor content of 0.5 wt % (E) | 92.7 | 92.7 | 92.7 | 92.7 | 92.7 | 92.7 | 92.7 | 92.7 |
| (C) HEC masterbatch with acid content of 2.8 wt % | 4.9 | 4.9 | 4.9 | 4.9 | 4.9 | 4.9 | 4.9 | 4.9 |
| (B) LDPE 450E | | | | | | | | |
| HS-E01 with glycerol monostearate (GMS) content of 50 wt % | 2 | 2 | 2 | 2 | 2 | 2 | 2 | 2 |
| Mistron Vapor R Talc | 0.5 | 0.5 | 0.5 | 0.5 | 0.5 | 0.5 | 0.5 | 0.5 |
| Polymer composition (total parts) | 100 | 100 | 100 | 100 | 100 | 100 | 100 | 100 |
| Isobutane | 10 | 10 | 10 | 10 | 10 | 10 | 10 | 10 |
| Foamable composition (total parts) | 110 | 110 | 110 | 110 | 110 | 110 | 110 | 110 |
| Zone 3 Set Temperature (° C.) "Foaming Temperature" | 111.7 | 111.1 | 110.6 | 110.0 | 109.4 | 108.9 | 108.3 | 107.8 |
| Properties of Foam Composition/Crosslinked Foam Composition | | | | | | | | |
| Density (g/cc) | 0.084 | 0.087 | 0.088 | 0.080 | 0.086 | 0.068 | 0.058 | 0.069 |
| Cell Type | open | some open | some open | open | open | open | open | open |
| Cell count per 12.7 mm | *NM | *NM | *NM | *NM | *NM | *NM | *NM | *NM |
| Cell Size (mm) | *NM | *NM | *NM | *NM | *NM | *NM | *NM | *NM |
| Gel Content (wt %) | *NM | *NM | *NM | *NM | *NM | *NM | *NM | *NM |

| | IE 9 | IE 10 | IE 11 | IE 12 | IE 13 | IE 14 | IE 15 |
| | | | Compositional Parts | | | | |
| --- | --- | --- | --- | --- | --- | --- | --- |
| (A) SI-LINK ™ AC DFDB-5451 with scorch inhibitor content of 0.5 wt % (E) | 92.7 | 92.7 | 9.8 | 9.8 | 9.8 | 9.8 | 9.8 |
| (C) HEC masterbatch with acid content of 2.8 wt % | 4.9 | 4.9 | 4.9 | 4.9 | 4.9 | 4.9 | 4.9 |

TABLE 3-continued

| | | | | | | | |
|---|---|---|---|---|---|---|---|
| (B) LDPE 450E | | | 82.9 | 82.9 | 82.9 | 82.9 | 82.9 |
| HS-E01 with glycerol monostearate (GMS) content of 50 wt % | 2 | 2 | 2 | 2 | 2 | 2 | 2 |
| Mistron Vapor R Talc | 0.5 | 0.5 | 0.5 | 0.5 | 0.5 | 0.5 | 0.5 |
| Polymer composition (total parts) | 100 | 100 | 100 | 100 | 100 | 100 | 100 |
| Isobutane | 10 | 10 | 10 | 10 | 10 | 10 | 10 |
| Foamable composition (total parts) | 110 | 110 | 110 | 110 | 110 | 110 | 110 |
| Zone 3 Set Temperature (° C.) "Foaming Temperature" | 107.2 | 106.1 | 115.0 | 113.9 | 112.7 | 111.7 | 116.1 |
| Properties of Foam Composition/Crosslinked Foam Composition | | | | | | | |
| Density (g/cc) | 0.058 | 0.044 | 0.066 | 0.070 | 0.065 | 0.070 | 0.063 |
| Cell Type | open | closed | closed | closed | closed | closed | closed |
| Cell count per 12.7 mm | 5.3 | 6.6 | *NM | *NM | *NM | *NM | *NM |
| Cell Size (mm) | 3.9 | 3.1 | *NM | *NM | *NM | *NM | *NM |
| Gel Content (wt %) | 74.3 | 73.3 | *NM | *NM | *NM | *NM | 10.8 |

*Not measured
wt % scorch inhibitor in polymer composition = 0.46 (IE1 to IE10) or 0.05 (IE11 to IE15)
wt % HEC in polymer composition = 0.14
wt % GMS in polymer composition = 1
wt % isobutane in foamable composition = 9

Surprisingly, IE1 when only cooled to a foaming temperature of 111.7° C. (almost 6° C. higher than Tm1) did not result in collapsed foam. Similarly, IE15 when only cooled to a foaming temperature of 116.1° C. (about 5° C. higher than Tm2) did not yield collapsed foam. Furthermore, inventive examples IE1 to IE10 and IE11 to IE15 exhibited a wide foaming temperature range, resulting in foam compositions that were open-cell, partially open cell, or closed-cell. The properties of IE1 to IE10 and IE11 to IE15 were in sharp contrast to CS1 to CS3 which could only be foamed in narrow foaming temperature ranges, and which only yielded closed-cell foams.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:

providing, an extruder under extrusion conditions at a temperature from 50° C. to 250° C., and a polymer composition comprising (A) from 5 wt % to 10 wt % ethylene/silane copolymer having a first melting temperature Tm1, from 106° C. to 110° C., (B) from 80 wt % to 90 wt % nonsilane functionalized polyolefin that is LDPE, having a second melting temperature, Tm2, from 111° C. to 120° C., (C) from 0.03 wt % to 0.2 wt % of a highly effective silanol condensation catalyst (HEC) that is an aromatic sulfonic acid catalyst, wherein wt % is based on total weight of the polymer composition, (D) from 0.1 wt % to 2.0 wt % of a permeability modifier that is an ester of a $C_{10}$ to $C_{24}$ fatty acid, and (E) a scorch inhibitor;

introducing, under the extrusion conditions, a physical blowing agent into the polymer composition to form a foamable composition;

cooling the foamable composition to a foaming temperature that is from 106.1° C. to 116.1° C.;

propelling the foamable composition from an exit die of the extruder to form a foam composition; and moisture curing of the foam composition to form a crosslinked foam composition having a density from 0.015 g/cc to 0.100 g/cc and a gel content from 10% to 95%.

2. The process of claim 1 wherein the ester of the $C_{10}$ to $C_{24}$ fatty acid is selected from the group consisting of glycerol monostearate, glycerol monobehenate, sorbitol monostearate, and combinations thereof.

\* \* \* \* \*